United States Patent
Chen (10) Patent No.: US 8,254,316 B2
(45) Date of Patent: Aug. 28, 2012

(54) QOS-BASED MULTI-PROTOCOL UPLINK ACCESS

(75) Inventor: John S. Chen, Downingtown, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 849 days.

(21) Appl. No.: 11/610,161

(22) Filed: Dec. 13, 2006

(65) Prior Publication Data

US 2007/0147326 A1    Jun. 28, 2007

Related U.S. Application Data

(60) Provisional application No. 60/750,545, filed on Dec. 15, 2005.

(51) Int. Cl.
H04W 4/00 (2009.01)
(52) U.S. Cl. ........ 370/329; 370/328; 370/332; 370/338; 370/389; 455/517; 455/560
(58) Field of Classification Search ................. 370/443, 370/348, 337, 329, 389, 328, 338; 455/450, 455/509, 512, 513, 560, 517
See application file for complete search history.

(56) References Cited

U.S. PATENT DOCUMENTS

| | | | |
|---|---|---|---|
| 6,597,682 B1 | 7/2003 | Kari | |
| 6,788,943 B1 | 9/2004 | Hämäläinen et al. | |
| 6,970,438 B2 * | 11/2005 | Mate et al. | 370/329 |
| 7,103,060 B2 | 9/2006 | Kornprobst et al. | |
| 2001/0026539 A1 * | 10/2001 | Kornprobst et al. | 370/329 |
| 2004/0146019 A1 * | 7/2004 | Kim et al. | 370/329 |

OTHER PUBLICATIONS

Kwok et al. IEEE vol. 13, No. 11 Nov. 2002 A novel channel-adaptive uplink access control protocol.*
3GPP ver 6.7v Sep. 2005 (applicant provided prior art).*
"On LTE Channel structure", 3GPP TSG RAN WG2 #48bis, Cannes, Frances, Oct. 10-14, 2005, R2-052501.
$3^{rd}$ Generation Partnership Project; Technical Specification Group Radio Access Network; Physical layer procedures (FDD) (Release 6), 3GPP TS 25.214 V6.7.0 (Sep. 2005).
$3^{rd}$ Generation Partnership Project; Technical Specification Group Radio Access Network; Physical layer procedures (FDD) (Release 7), 3GPP TS 25.214 V7.2.0 (Sep. 2006).
$3^{rd}$ Generation Partnership Project; Technical Specification Group Radio Access Network; Radio Resource Control (RRC); Protocol Specification (Release 6), 3GPP TS 25.331 V6.7.0 (Sep. 2005).
$3^{rd}$ Generation Partnership Project; Technical Specification Group Radio Access Network; Radio Resource Control (RRC); Protocol Specification (Release 7),3GPP TS 25.331 V7.2.0 (Sep. 2006).

(Continued)

*Primary Examiner* — Kamran Afshar
*Assistant Examiner* — Manpreet Matharu
(74) *Attorney, Agent, or Firm* — Volpe and Koenig, P.C.

(57) ABSTRACT

A method and apparatus for multi-protocol uplink access defines two protocols and maps each to one of a user's access service class (ASC) and quality of service (QoS). A first uplink access protocol type is defined in which a random access channel (RACH) burst is sent and an acquisition indicator channel (AICH) burst is sent, and a channel assignment grant is sent on another downlink channel. A second uplink access protocol type is defined in which a RACH preamble is sent and an AICH burst is sent.

29 Claims, 4 Drawing Sheets

OTHER PUBLICATIONS

3rd Generation Partnership Project; Technical Specification Group Radio Access Network; Physical channels and mapping of transport channels onto physical channels (FDD) (Release 6), 3GPP TS 25.211 V6.6.0 (Sep. 2005).

3rd Generation Partnership Project; Technical Specification Group Radio Access Network; Physical channels and mapping of transport channels onto physical channels (FDD) (Release 7), 3GPP TS 25.211 V7.0.0 (Mar. 2006).

Nevin, Anne "UMTS", Mobile Telematics 2004.

* cited by examiner

QOS-BASED MULTI-PROTOCOL UPLINK ACCESS

This application claims priority from U.S. Provisional Patent Application Ser. No. 60/750,545, filed Dec. 15, 2005, which is incorporated by reference as if fully set forth.

FIELD OF INVENTION

The present invention relates to wireless communications, particularly, to uplink access employing multiple access protocols.

BACKGROUND

Long term evolution (LTE) of WCDMA 3G cellular networks pertains to UMTS beyond 3GPP Release 7. Another term used to express LTE is evolved (Universal Terrestrial Radio Access" i.e.) "evolved (UTRA)" (E-UTRA).

3GPP Release 6 uses a random access channel (RACH) procedure for initial uplink access. The RACH procedure defines a preamble burst handshake followed by a short, preconfigured message. Random access based on an uplink grant channel has been proposed for E-UTRA.

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, site controller, access point (AP) or any other type of interfacing device in a wireless environment.

A general problem with uplink access protocols is that one access protocol may not work in all cases. For example, no single access protocol supports all traffic types equally well. A Telnet application is highly bursty, has a low data rate, and is highly delay sensitive—the current 3GPP RACH procedure might work very well for this type of application. On the other hand, web browsing requires more bandwidth in the uplink, and is not as sensitive to delay as Telnet, whereby an alternate access protocol may prove superior for this application. Another example is that the best protocol may vary as a function of cell load. Combining this with existing considerations in UTRA, there is a need to define an uplink access framework with all of the following attributes:

A WTRU should be able to use multiple uplink access protocols.

The initial uplink access burst should contain few (or no) information bits to maximize decoding performance while minimizing needed bandwidth (the RACH preamble in the current standard has no information bits).

Likewise, the response to the initial uplink access burst should contain few (or no) information bits (the Acquisition Indicator Channel (AICH) message in the current standard has a single information bit, namely, the acquisition indicator bit).

SUMMARY

The present invention teaches a method to facilitate efficient uplink random access geared towards an all-IP radio access network (e.g., E-UTRA). It does so by allowing configuration of uplink access based on a user's profile or the Quality of Service (QoS) profile of the application. This invention is primarily concerned with physical (PHY) and MAC layer signaling associated with uplink access.

DETAILED DESCRIPTION OF THE PREFERRED EMBODIMENT

The present invention basically comprises two parts. The first part enhances the access configuration capability of the WTRU by adding information fields broadcast by the base station (BS) to indicate the uplink access method for a user's (or a user's application) Access Service Class (ASC); (the ASC in UTRA can be regarded as being mapped to a given QoS). The second part of the present invention provides a specific scheme whereby two uplink access protocols are supported using the configuration capability defined in the above-mentioned first part.

Figure 1:
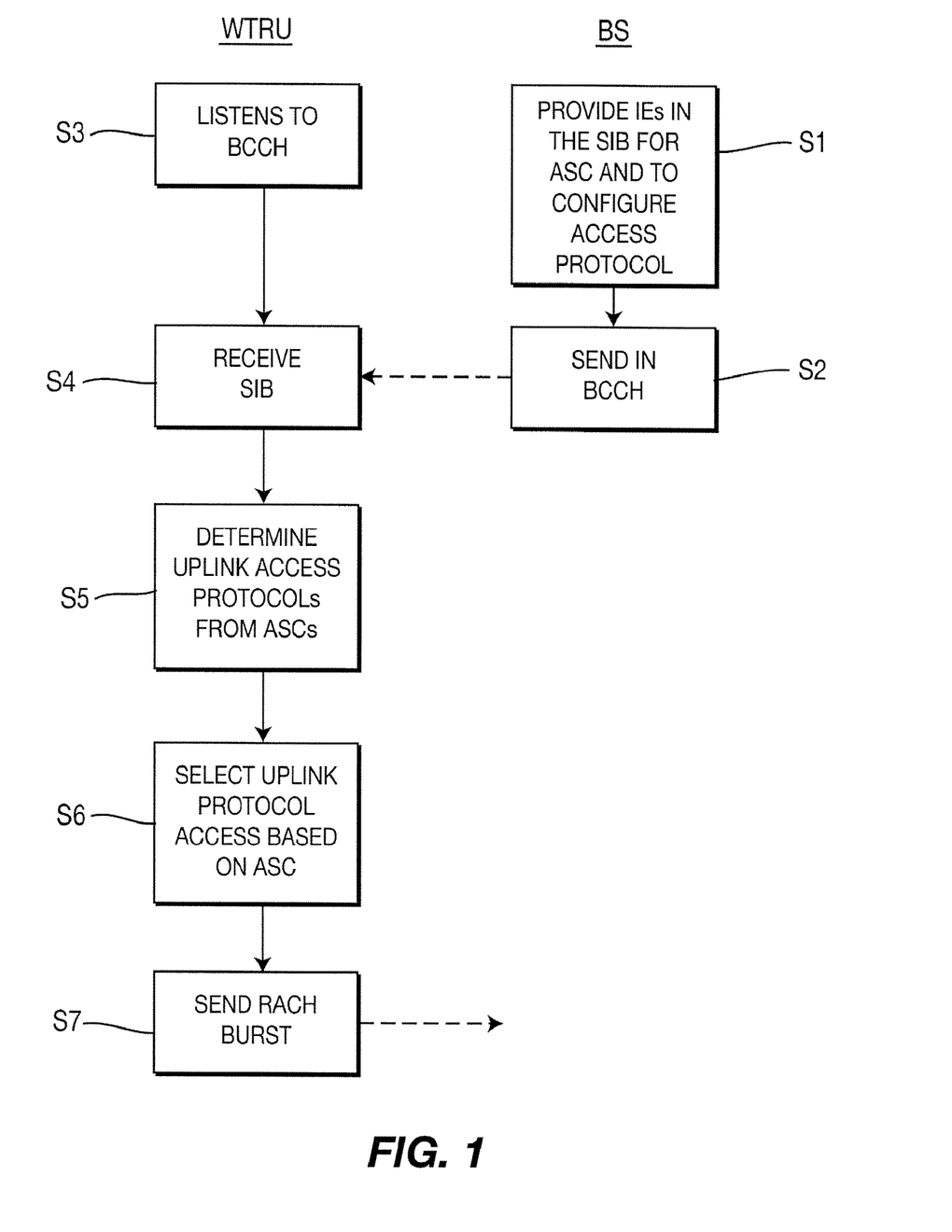
FIG. 1 is a flow diagram of a method for broadcasting information to enhance access by a WTRU.

With respect to the first part of the present invention regarding an ASC-based configuration of access, in FIG. 1, the BS provides one or more information elements (IEs) at step S1, and transmits the IEs in the System Information Block (SIB) of the Broadcast Control Channel (BCCH) at S2 to configure the access protocols. An IE for the PHY RACH (PRACH) partition is presented below in Table 1 with its IE components, including the Uplink Access Protocol IE introduced by the present invention. Note that in LTE, the original IE is not guaranteed to remain the same.

TABLE 1

| PRACH Partition IE | | | | |
|---|---|---|---|---|
| Information Element/Group name | Need | Multi | Type and reference | Semantics description |
| Access Service Class (ASC) | MP | 1 to maxASC | | If only "NumASC+1" (with, NumASC+1 < maxASC) ASCs are listed, the remaining (NumASC+2 through maxASC) ASCs are unspecified. |
| Uplink Access Protocol | MD | | Integer(0, . . . , 7) | The default values are the same as the previous ASC. For the first ASC, this field is |

TABLE 1-continued

PRACH Partition IE

| Information Element/Group name | Need | Multi | Type and reference | Semantics description |
|---|---|---|---|---|
| >ASC Setting | MD | | ASC setting 10.3.6.6 | MP. The value is an enumeration of uplink access protocols. The default values are the same as the previous ASC. If the "default" is used for the first ASC, the default values are all available signatures and "all available sub-channels" for FDD and "all available channelisation codes" and "all available subchannels" with "subchannel size=Size 1" in TDD. |

Regarding the terms MP AND MD, employed in Table 1 and subsequent tables, MP means "mandatory present," indicating that the field must be present in the information element and MD means "mandatory default," meaning that the given value is the default value. The ">" marks aid in discerning the meaning of the tables.

The WTRU at S3, listens to the broadcast control channel (BCCH) for this IE and receives it at S4. The WTRU, then determines the uplink access protocol at S5, based on the ASC. When the WTRU wishes to access the radio network, the WTRU selects the uplink access protocol based on the radio bearer's ASC, at S6 and sends it in a RACH burst at S7.

It should be noted that each PRACH resource definition must be well-defined with respect to the uplink access protocol partition. In other words, if two ASCs use different uplink access protocols, their PRACH resources must be disjoint.

The following describes the second part of the present invention pertaining to multi-protocol uplink access.

Figure 2:
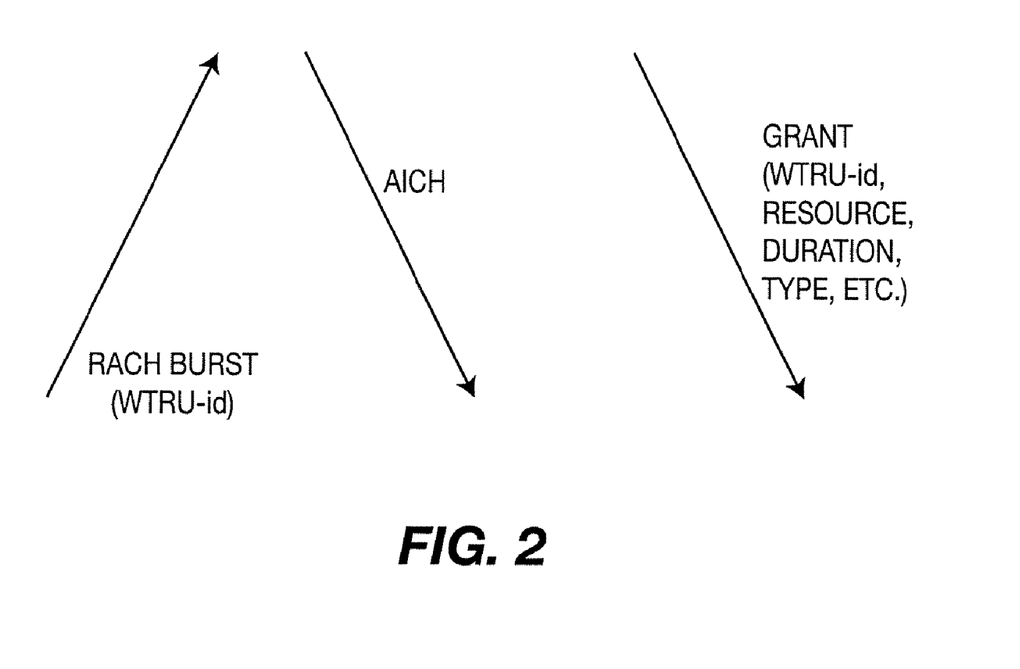
FIGS. 2 and 2A respectively show simplified and detailed diagrams of Type 1 uplink access according to the present invention.

FIG. 2 shows a simplified Type 1 uplink access sequence, comprising a RACH burst, responded to by an AICH, and a GRANT signal with the WTRU-id resource, duration, type, etc. The WTRU-id could be any identity that uniquely identifies a WTRU within a cell. The PRACH has cell-specific scrambling to distinguish the RACH burst from among neighboring cells, as will be described in connection with FIG. 2A, which shows a more detailed flow diagram of the Type 1 sequence wherein the WTRU incorporates the WTRU-id in the RACH burst at S8 and sends the RACH burst at S9.

Figure 2A:
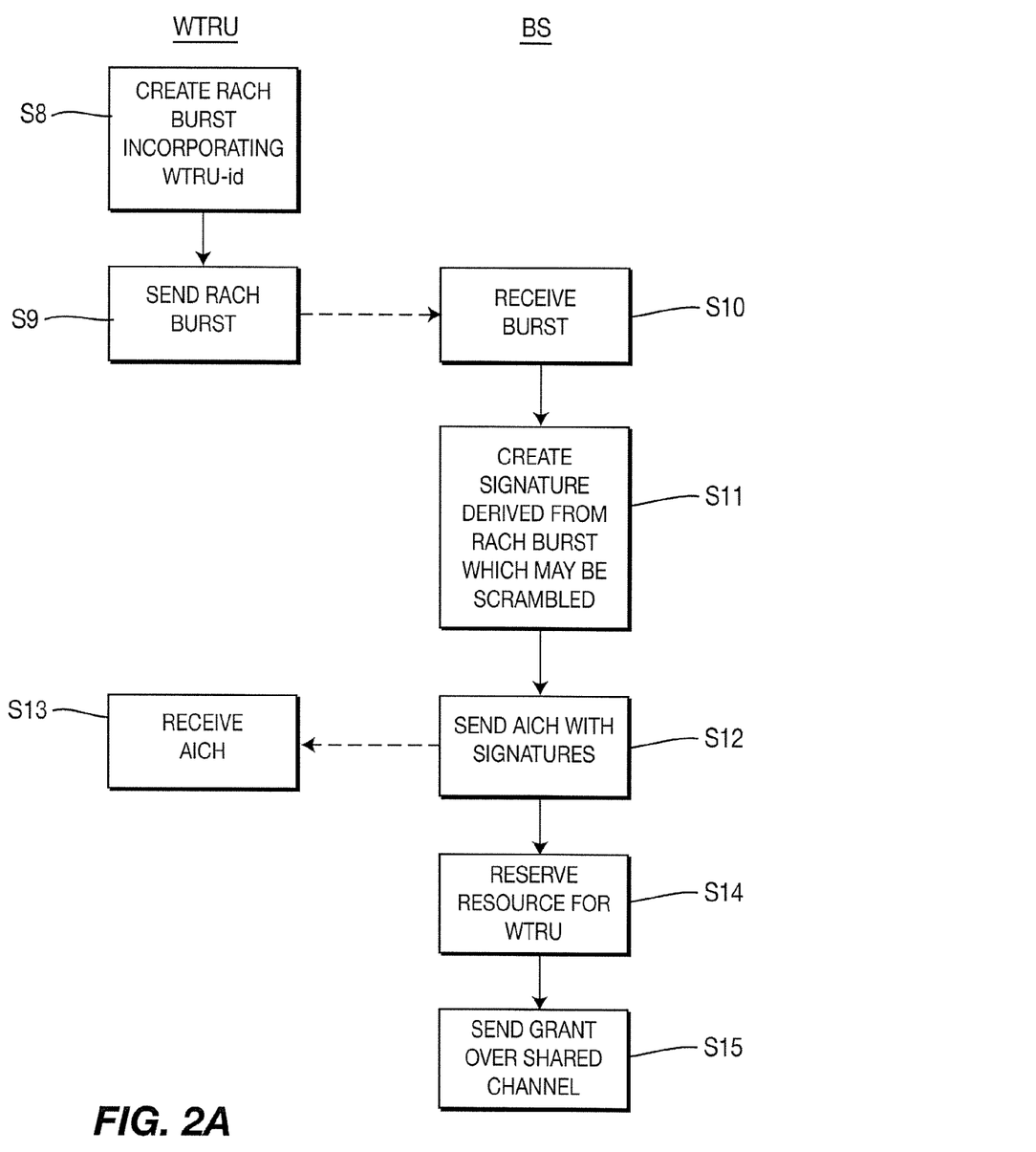

The Acquisition Indicator Channel burst (AICH) acknowledges the WTRU by applying a signature at S11 derived from the RACH burst received by the BS, at S10. For example, the signature could be selected as a hash function of the WTRU-id. Additionally, the AICH may include WTRU-specific scrambling (e.g., scrambling with the WTRU-id) in order to avoid collision capture effects. More specifically, a case will be considered wherein two WTRUs send a RACH burst simultaneously, and the received power for one of them is strong enough to be decoded in the presence of the other WTRU. It is further assumed that the AICH signature is common between the two WTRUs. In this case, WTRU-specific scrambling prevents the wrong WTRU from decoding the AICH. WTRU-specific scrambling may not be essential, particularly if this scenario is very rare. The wrong WTRU waits for a timeout period before discovering that the base station has not granted it a resource.

The AICH S12 in this case serves as an acknowledgement to the WTRU that it has been heard (so that it does not continue to retry transmitting when it receives the AICH at S13) and as a placeholder in the base station to reserve a resource for this WTRU, at S14. In this way, the WTRU obtains a resource grant with a relatively lean RACH/AICH exchange. The AICH may also send a NACK if the base station detects a collision.

The GRANT is preferably sent on a downlink shared channel configured by the SIBs in the BCCH, at S15.

The duration of the channel may be specified by the channel GRANT as shown in FIGS. 2 and 2A. Alternatively, the channel duration need not be specified, and a protocol is established for terminating the channel. Another approach is to use the channel GRANT to bootstrap a tiered access scheme. This means that the GRANT provides a low bandwidth uplink channel used as a contention-free access channel.

The timeout for receiving a GRANT is ASC dependent, and it is configured by a new Grant Timeout IE in the SIB, as shown in TABLE 2.

TABLE 2

Type 1 Access parameters

| Information Element/ Group name | Need | Multi | Type and reference | Semantics description |
|---|---|---|---|---|
| Access Service Class | MP | 1 to maxASC | | If only "NumASC+1" (with, NumASC+1 < maxASC) ASCs are listed, the remaining (NumASC+2 through maxASC) ASCs are unspecified. |
| >Grant Timeout | MP | | Integer | The default values are the same as the previous ASC. |

Figure 3:
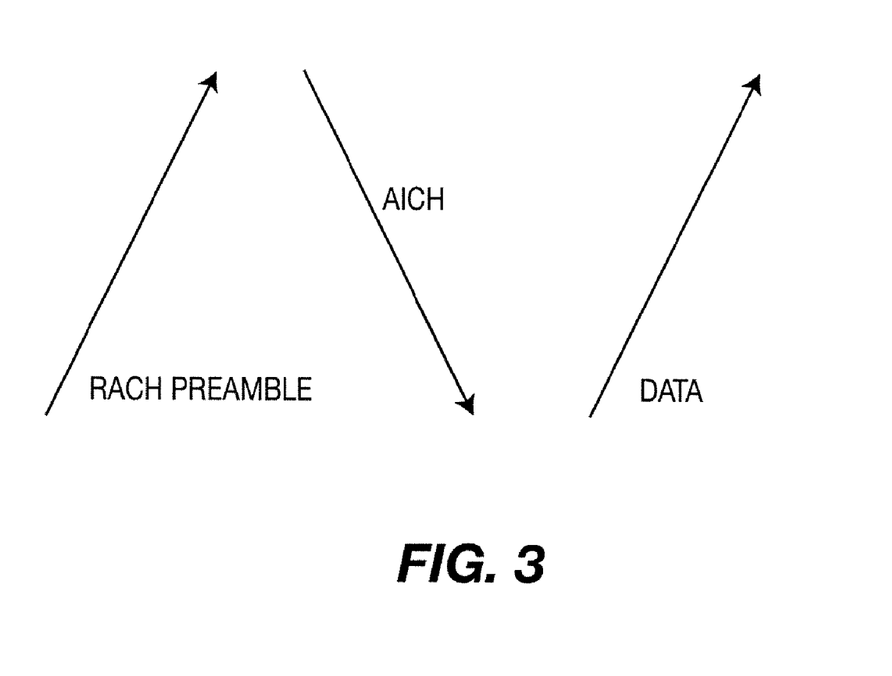
FIGS. 3 and 3A respectively show simplified and detailed diagrams of a Type 2 uplink access according to the present invention.

FIG. 3 shows a simplified Type 2 uplink access comprising a RACH preamble, an AICH and a DATA transmission. The Type 2 access procedure, in accordance with the present invention optimizes the LTE air interface. As shown in FIG. 3, the DATA resource is uniquely derivable from the RACH preamble, e.g., it is a function of the RACH preamble's resource (e.g., signature and slot). The size of DATA sent by the WTRU is restricted by an IE in the AICH in order to control the efficiency of Type 2 random access channels. The AICH attributes (e.g., signature, scrambling, transmission time) are uniquely derivable by the BS from a successfully decoded RACH preamble.

Type 1 is enumerated as 0 in the Uplink Access Protocol IE, and Type 2 is enumerated as 1.

Figure 3A:
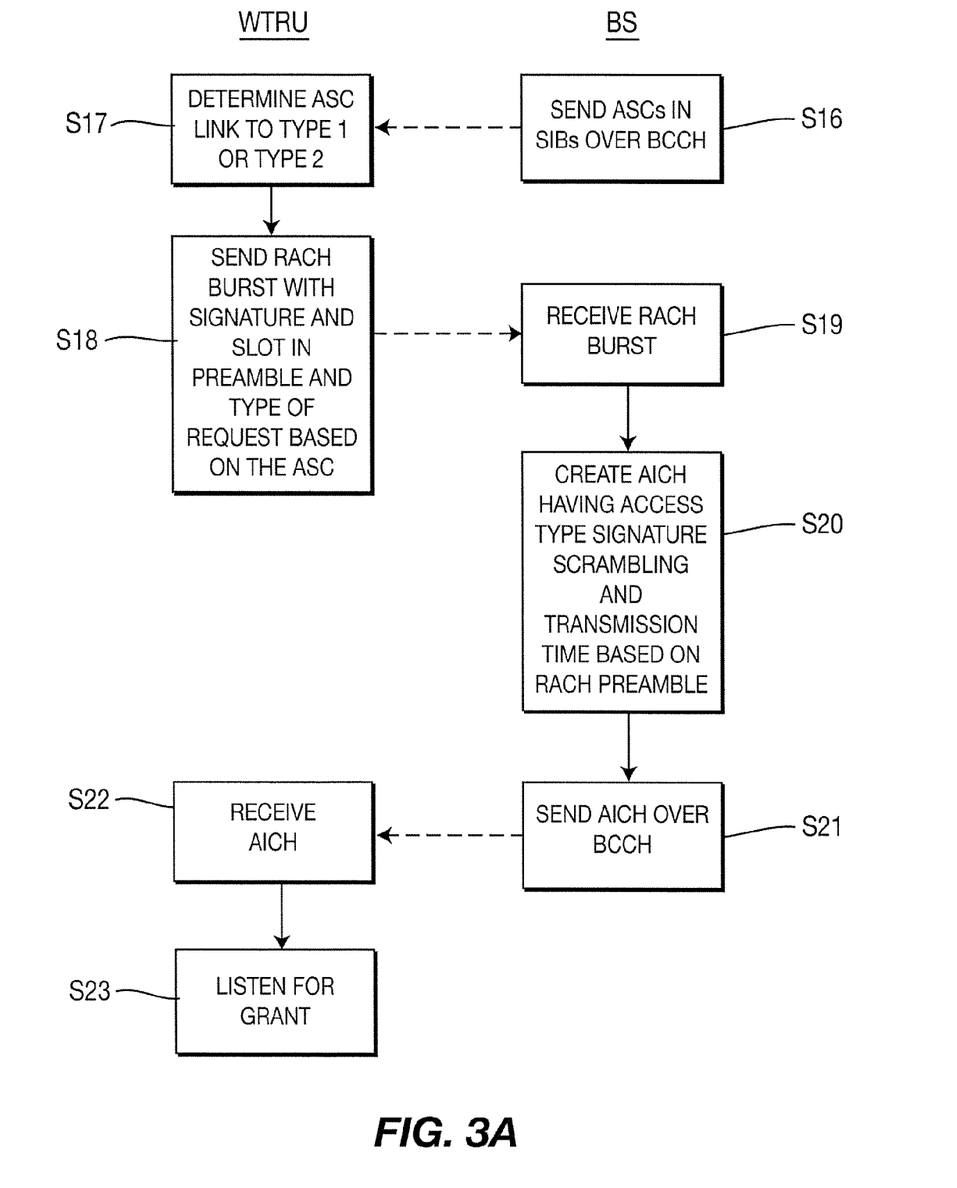

As shown in the detailed diagram in FIG. 3A, at S17 the WTRU determines the most current mappings of ASC to Type 1 or 2 through the SIBs sent in the BCCH at S16, and sends a Type 1 or Type 2 request based on the ASC at S18. The base station (BS) receives the burst at S19, creates an AICH at S20 and responds to a RACH preamble with Type 1 or Type 2 access based on the PRACH resource, at S21.

The Type 2 mechanism can be leveraged to gain an uplink channel GRANT. The WTRU, at S17 sends a buffer volume measurement in the DATA portion of the Type 2 access. The base station (BS) can then schedule a channel GRANT for this bearer at some later time.

For a Type 1 access, the WTRU preferably uses a retry policy on the RACH preamble similar in concept to the current standard, but adapted to changes in the air interface technology of LTE. If it receives an AICH response at S22, the WTRU then listens for a GRANT at S23 to determine its resource allocation. When the base station receives a RACH for a Type 1 ASC, it uses a scheduling algorithm to determine what (if any) resource to grant the WTRU.

One example of multi-protocol uplink access is differentiation by user application or QoS profile. Type 1 is well suited for applications that have a relatively small but varying uplink load such as web surfing or wireless gaming. Type 2 is preferred for low rate bursty applications like Telnet or possibly FTP downloads.

Another usage example is for control messaging (either Access Stratum or Non-Access Stratum messages). Type 2 is useful for sparse uplink control messaging. The current standard uses its RACH channel this way. Type 1 may be used for initial system access (i.e., when the WTRU first powers up), and the PRACH partition could specify channels used just for initial access. This is useful because initial access is a well-defined interchange, so both the WTRU and base station are able to independently determine the end of the initial (core network level) access exchange.

An alternative Type 1 uplink access may be useful based on the following. The Type 1 access as defined above adds a WTRU-id field in the RACH burst because there is a significant probability of undetected collisions in the RACH with preamble only. This happens when: 1) two WTRUs transmit with the same signature at the same time, and 2) the base station decodes this as a preamble coming from a single WTRU (e.g., it mistakenly treats the two bursts as multi-path from a single WTRU). If the RACH physical layer structure is designed to reduce the undetected collision probability, alternative access protocols may be used. For example, the WTRU-id may be sent (e.g., as a field in the granted uplink channel) to the base station. A collision is resolved by a channel startup protocol. For example, the WTRU starts transmission randomly out of 2 or 3 slots, and a WTRU gives up on the shared channel after a few (say 5) consecutive failed transmissions on the granted uplink channel. Moreover, if the base station detects a collision, it could signal this in the downlink.

The present invention may be implemented in a WTRU or a BS, as a data link layer implementation preferably configured by software or a protocol stack. The present invention is applicable to radio resource management (RRM) and a radio resource controller. In addition to the applicability to LTE, the present invention applies to the core evolution program.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method implemented in a wireless transmit/receive unit (WTRU) for uplink access to a wireless network, where a plurality of access service classes (ASCs) are available, the method comprising:

the WTRU receiving a broadcast message from a base station indicating a plurality of available uplink access protocols for each access service class (ASC) available to the WTRU, the message including Information Elements (IEs) to identify the Access Service Class (ASC) and to configure the uplink access protocols; and the WTRU selecting an access protocol to use in response to the WTRU needing to access the network, the access protocol selected from among the plurality of uplink access protocols based on the identified ASC;

wherein the IEs are inserted in a System Information Block (SIB) of a Broadcast Control Channel (BCCH); and wherein the ASC is mapped to a given quality of service (QoS) to configure access capabilities of the WTRU.

2. The method of claim 1, further comprising:

the WTRU receiving the Uplink Access Protocol IE; and determining an uplink access protocol based on an ASC of the WTRU.

3. The method of claim 1, further comprising:

the WTRU receiving the uplink access protocol IE; and configuring the uplink access based on the WTRU's profile.

4. The method of claim 1, further comprising:

the WTRU receiving the uplink access protocol IE; and configuring the uplink access based on a quality of service (QoS) profile of an application.

5. The method of claim 1, wherein the uplink access protocol IE is contained within a Physical (PHY) layer random access channel (PRACH) partition.

6. The method of claim 5, wherein each PRACH resource definition is defined with respect to each uplink access protocol partition, such that two ASCs with different uplink access protocols have disjoint PRACH resources.

7. A method for defining an uplink access protocol through an exchange between a wireless transmit/receive unit (WTRU) and a base station (BS), comprising:

the WTRU sending a random access channel (RACH) burst including a WTRU-id that uniquely identifies the WTRU to the BS; and the WTRU, responsive to the RACH burst, receiving on a first downlink channel, an acquisition indicator channel (AICH) burst to acknowledge the access request, the AICH burst comprising an Information Element;

receiving a channel assignment grant following the AICH burst on another downlink channel, wherein the grant is configured by a grant timeout information element indicating a timeout for receiving the grant based on an access service class assigned to the WTRU; and the WTRU, responsive to the channel assignment grant, sending the WTRU-id to the BS as a field in the granted uplink channel.

8. The method of claim 7, wherein said another downlink channel is a shared downlink channel.

9. The method of claim 7, wherein the RACH burst incorporates a signature derived from the RACH burst.

10. The method of claim 7, wherein the AICH incorporates WTRU-specific scrambling.

11. The method of claim 8, wherein a channel collision is resolved by a channel startup protocol, the WTRU starting a transmission randomly out of a predetermined number of slots in the shared, granted channel; and aborting the shared granted channel after a given number of consecutive failed transmissions on the shared granted channel have occurred.

12. The method of claim 8, further comprising the WTRU receiving a report of a detected collision in a downlink transmission.

13. The method of claim 7, further comprising the WTRU receiving a NACK in the AICH that indicates detection of a collision due to at least two WTRUs sending RACH bursts at substantially the same time.

14. The method of claim 7, wherein the channel assignment grant incorporates a duration to specify a duration for the channel.

15. A method employed by a wireless transmit/receive unit (WTRU) to obtain uplink access from a base station (BS), comprising:
    determining a type of uplink access protocol type based on a first information element (IE) received in a system information block of a message received on a broadcast channel from the BS;
    sending by the WTRU a random access channel (RACH) preamble burst defined by a first uplink access protocol type;
    receiving by the WTRU an acquisition indicator channel (AICH) burst sent by the BS on a first downlink channel to acknowledge the access request, the AICH burst comprising a second IE for restricting a size of data which can be sent by the WTRU; and
    the WTRU receiving a channel assignment grant on another downlink channel, wherein the grant is configured by a grant timeout information element indicating a timeout for receiving the grant based on an access service class assigned to the WTRU;
    wherein a second uplink access protocol type in which a RACH preamble is sent by the WTRU is defined and the WTRU receiving an AICH burst;
    wherein the Access Service Class (ASC) is mapped to the first or second access protocol type; and
    the WTRU sending a RACH burst requesting one of the first uplink access protocol type and the second uplink access protocol type based on its associated ASC.

16. The method of claim 15, further comprising the WTRU receiving an Information Element (IE) in a System Information Block (SIB) identifying the uplink access protocol type enabling the WTRU to select a desired uplink access protocol.

17. The method of claim 16, further comprising the WTRU selecting the desired uplink access protocol based on the ASC.

18. The method of claim 15, further comprising the WTRU receiving Information Elements (IEs) in a System Information Block (SIB) identifying: the uplink access protocol type enabling the WTRU to select a desired uplink access protocol, the ASC and an ASC setting.

19. A wireless transmit/receive unit (WTRU) in a wireless communication with a base station (BS), comprising:
    a receiver configured to receive a broadcast message from the BS indicating a plurality of available uplink access protocols for each access service class (ASC), the broadcast including an Uplink Access Protocol information element (IE) in a System Information Block (SIB) of a Broadcast Control Channel (BCCH), the IE identifying an access service class for the WTRU,
    the receiver configured to select an access protocol based on the WTRU's access service class;
    the receiver receiving a channel assignment grant on another downlink channel, wherein the grant is configured by a grant timeout information element indicating a timeout for receiving the grant based on an access service class assigned to the WTRU; and
    a mapping device for mapping each ASC to a given quality of service (QoS) configuring access capabilities of the WTRU.

20. The apparatus of claim 19, wherein the uplink access protocol IE is contained within a Physical (PHY) layer random access channel (PRACH) partition.

21. The apparatus of claim 20, wherein each PRACH resource definition is defined with respect to each uplink access protocol partition, such that two ASCs with different uplink access protocols have disjointed PRACH resources.

22. An apparatus for defining an uplink access protocol through an exchange between a wireless transmit/receive unit (WTRU) and a base station (BS), the apparatus comprising:
    a device configured to send a random access channel (RACH) burst including a WTRU-id that uniquely identifies the WTRU to the BS; and
    a device responsive to the RACH burst, configured to receive on a first downlink channel, an acquisition indicator channel (AICH) burst to acknowledge the access request, the AICH burst comprising an Information Element having a size of a single bit;
    a device configured to receive a channel assignment grant following the AICH on another downlink channel, wherein the grant is configured by a grant timeout information element indicating a timeout for receiving the grant based on an access service class assigned to the WTRU; and
    a transmitter for sending the WTRU-id to the BS as a field in the granted channel.

23. The apparatus of claim 22, wherein said another downlink channel is a shared downlink channel.

24. The apparatus of claim 22, the WTRU comprising a device configured to receive an AICH acknowledging the RACH burst which incorporates a signature derived from the RACH burst.

25. The apparatus of claim 22, wherein the channel assignment grant incorporates a duration to specify a duration for the channel.

26. A base station (BS), comprising:
    a device configured to receive a random access channel (RACH) preamble burst defined by a first uplink access protocol type and configured to send an acquisition indicator channel (AICH) burst on a first downlink channel, the AICH burst comprising an Information Element having a size of a single bit for restricting a size of data which can be sent by wireless transmit/receive unit (WTRU), the device further configured to send a channel assignment grant on another downlink channel wherein the grant is configured by a grant timeout information element indicating a timeout for receiving the grant based on an access service class assigned to the WTRU;
    the device is further configured to receive a RACH preamble defined by a second uplink access protocol type and is further configured to send an AICH burst;
    the device further configured to map Access Service Class (ASC) to the first or second access protocol type; and
    the device is further configured to receive a RACH burst requesting uplink access according to one of the first uplink access protocol type and the second uplink access protocol type based on ASC of the WTRU.

27. The apparatus of claim 26, said device responding a preamble of the RACH burst based on the Physical RACH (PRACH) resource.

28. The apparatus of claim 27, said device for incorporating an Information Element (IE) in a System Information Block (SIB) identifying the uplink access protocol type enabling the WTRU to select a desired uplink access protocol.

29. The apparatus of claim 27, wherein the device is configured to incorporate Information Elements (IEs) in a System Information Block (SIB) identifying: the uplink access protocol type enabling the WTRU to select a desired uplink access protocol; the ASC and an ASC setting.

* * * * *